United States Patent
Weaver et al.

(10) Patent No.: US 8,852,786 B2
(45) Date of Patent: Oct. 7, 2014

(54) CERAMIC-METAL SEALING STRUCTURE, AND ASSOCIATED METHOD

(75) Inventors: Scott Andrew Weaver, Ballston Lake, NY (US); Don Mark Lipkin, Niskayuna, NY (US); Radhakrishna Badekila Bhat, Niskayuna, NY (US); Andrew Joseph Detor, Albany, NY (US); Brian William Cerniglia, Waterford, NY (US)

(73) Assignee: General Electric Company, Niskayuna, NY (US)

( * ) Notice: Subject to any disclaimer, the term of this patent is extended or adjusted under 35 U.S.C. 154(b) by 706 days.

(21) Appl. No.: 12/976,453

(22) Filed: Dec. 22, 2010

(65) Prior Publication Data

US 2012/0164510 A1 Jun. 28, 2012

(51) Int. Cl.
| | |
|---|---|
| H01M 2/08 | (2006.01) |
| B23K 35/20 | (2006.01) |
| C04B 35/645 | (2006.01) |
| B23K 20/02 | (2006.01) |
| B23K 20/16 | (2006.01) |
| C04B 37/02 | (2006.01) |
| H01M 10/04 | (2006.01) |
| B23K 1/00 | (2006.01) |
| B23K 20/233 | (2006.01) |
| H01M 10/39 | (2006.01) |
| H01M 4/38 | (2006.01) |
| H01M 4/58 | (2010.01) |

(52) U.S. Cl.
CPC ........... *B23K 20/023* (2013.01); *C04B 2237/52* (2013.01); *B23K 2201/38* (2013.01); *C04B 2237/127* (2013.01); *H01M 4/381* (2013.01); *C04B 35/645* (2013.01); *C04B 2235/963* (2013.01); *B23K 20/16* (2013.01); *C04B 2237/123* (2013.01); *H01M 2/08* (2013.01); *C04B 2237/525* (2013.01); *C04B 2237/708* (2013.01); *C04B 2237/405* (2013.01); *C04B 37/026* (2013.01); *B23K 2203/18* (2013.01); *Y02E 60/12* (2013.01); *H01M 10/04* (2013.01); *B23K 1/0008* (2013.01); *B23K 2203/08* (2013.01); *C04B 2237/122* (2013.01); *B23K 20/233* (2013.01); *C04B 2237/12* (2013.01); *H01M 10/39* (2013.01); *H01M 4/582* (2013.01); *C04B 2237/72* (2013.01)
USPC ...................... 429/142; 228/122.1; 228/124.5

(58) Field of Classification Search
USPC ......... 429/129–147, 247–255, 163–187, 208; 29/623.1–623.5
See application file for complete search history.

(56) References Cited

U.S. PATENT DOCUMENTS

| | | | | |
|---|---|---|---|---|
| 4,352,714 A | * | 10/1982 | Patterson et al. | ................ 216/33 |
| 4,638,555 A | * | 1/1987 | MacLachlan et al. | ........ 29/623.1 |
| 5,009,357 A | * | 4/1991 | Baker et al. | ................. 228/122.1 |
| 7,312,422 B2 | | 12/2007 | Wintenberger et al. | |
| 7,523,794 B2 | | 4/2009 | Hall et al. | |
| 2007/0207310 A1 | * | 9/2007 | Storey | ........................... 428/336 |
| 2008/0006204 A1 | | 1/2008 | Rusinko et al. | |

* cited by examiner

*Primary Examiner* — Basia Ridley
*Assistant Examiner* — Caitlin Wilmot
(74) *Attorney, Agent, or Firm* — Francis T. Coppa

(57) ABSTRACT

A method of sealing a ceramic component to a metal component for a metal halide battery is provided. The method involves the steps of coating a portion of the ceramic component with a metallic coating, and then bonding the coated ceramic component to the metal component. The metallic coating includes a reactive metal. A sealing structure formed by using such a method is also presented.

14 Claims, 1 Drawing Sheet

```
┌─────────────────────────────────────────────────────┐
│   Provide a ceramic component of a metal halide battery   │
└─────────────────────────────────────────────────────┘
                            │
                            ▼
┌─────────────────────────────────────────────────────┐
│      Apply a metallic coating on the ceramic component      │
└─────────────────────────────────────────────────────┘
                            │
                            ▼
┌─────────────────────────────────────────────────────┐
│           Bond the coated ceramic component                │
│         with a metal component of the battery              │
└─────────────────────────────────────────────────────┘
```

CERAMIC-METAL SEALING STRUCTURE, AND ASSOCIATED METHOD

BACKGROUND

The invention relates generally to a method of sealing a metal halide battery. More particularly, the invention relates to a method of sealing a ceramic separator to a metal component in the metal halide battery. The invention also relates to a sealing structure for a metal halide battery, formed by using such a method.

Development work has been undertaken on high temperature rechargeable batteries/cells, using sodium for the negative electrodes. The liquid sodium anode is separated from a cathode by a sodium-ion conducting solid electrolyte separator. The anode and the cathode are sealed from each other at atmospheric pressure. Suitable materials for the solid electrolyte separator include beta alumina and beta" alumina, known as beta alumina separator electrolyte (BASE). Usually, these batteries or cells have a metallic casing, and may also have other metallic components.

Ceramic components of the cell are typically joined via a seal glass. Metallic components are often joined by welding or thermal compression bonding. However, ceramic-to-metal bonding in the high temperature cell may crack, due to thermal stress caused by a mismatch in the coefficient of thermal expansion for each material. Thus, the bond may have a limited life, and bond failure may cause cell failure.

A common bonding technique uses a porous metal layer applied in the form of paste or ink, which then combines with a glassy phase from the ceramic separator, by wicking or capillary action. The metal layer is often screen-printed. This metal layer is then bonded to the metal component by diffusion bonding or brazing. However, this process requires close process control to assure strong, hermetic, defect-free bonds, and the complexity of such control may make the process economically unsuitable.

Furthermore, the battery application prefers the use of a high purity alumina to address corrosion concerns. However, the above process is not amenable to high-purity alumina, because little or no glass phase is available to promote bonding.

It would therefore be desirable to develop new methods for efficiently sealing metal halide batteries.

BRIEF DESCRIPTION

One embodiment provides a method of sealing a ceramic component to a metal component for a metal halide battery. The method involves the steps of coating a portion of the ceramic component with a metallic coating, and then bonding the coated ceramic component to the metal component. The metallic coating includes a reactive metal.

Another embodiment is a method, in which a portion of the alumina component of a metal halide battery is coated with a metallic coating by an ion plasma deposition technique. The coated alumina component is then bonded to a nickel-containing metal component of the metal halide battery. The metallic coating includes a chromium layer disposed on the alumina component, and a nickel-chromium layer disposed on the chromium layer.

In one embodiment, a sealing structure of a metal halide battery is disclosed. The sealing structure includes a portion of a ceramic component coated with a metallic coating. The metallic coating includes a reactive metal. The coated portion of the ceramic component is bonded to a metal component through the metallic coating, so as to form the sealing structure.

DRAWINGS

These and other features, aspects, and advantages of the present invention will become better understood when the following detailed description is read with reference to the accompanying drawings, wherein.

DETAILED DESCRIPTION

Figure 1:
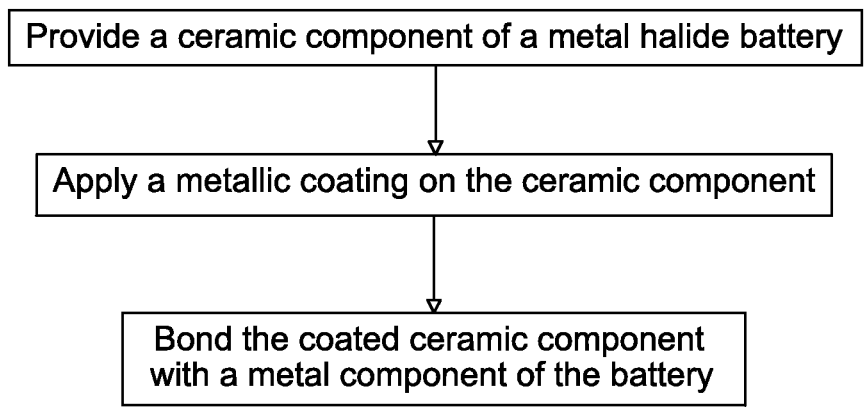
FIG. 1 is a flow diagram depicting a method of sealing, according to one embodiment of the invention.

Approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

In the following specification and the claims, the singular forms "a", "an" and "the" include plural referents unless the context clearly dictates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances, an event or capacity can be expected, while in other circumstances the event or capacity cannot occur.

As discussed in detail below, some of the embodiments of the present invention provide a method of sealing a ceramic component to a metal component in a metal halide battery. These embodiments advantageously provide an improved method for sealing the battery.

Ion Plasma Deposition (IPD), as used herein, refers to the use of a controlled vacuum arc discharge on a consumable cathode material to create highly energized plasma containing ions, atoms, and particles of the cathode constituents.

The term "macroparticles" as used herein, refers to particles larger than a single ion or atom. Macroparticles usually refer to particles ranging in diameter from about 10 nm to about 100 microns.

Typically, the metal halide battery is a secondary electrochemical energy storage cell. Secondary electrochemical energy storage cells accept and deliver direct-current electricity. During charging, energy is stored in the form of chemical potential, as the result of one or more reduction/oxidation (REDOX) reactions. During discharging, a portion of this energy is returned as electricity, while the same reactions proceed in reverse. For example, lead-acid cells are the most common secondary electrochemical energy storage cells. These batteries or cells usually include a cathode, an anode, and an electrolyte.

According to one embodiment of the present invention, the metal halide battery is a high temperature sodium-metal halide cell. The anode is formed of molten sodium, and the cathode involves a high surface area metal electrode. Unlike other secondary cells, the metal halide cell employs two electrolytes. The first electrolyte is a sodium ion conducting solid separator. The sodium anode wets one face of the solid separator. The second electrolyte is a molten salt, which occupies pore space in the cathode volume. The second electrolyte wets the solid separator on a second face of the separator. The second electrolyte also wets the metal cathode.

Applying a voltage between the anode and the cathode of the electrochemical cell may charge the electrochemical cell. In one embodiment, sodium chloride in the cathode dissolves to form sodium ions and chloride ions during charging. Sodium ions, under the influence of applied electrical potential, conduct through the separator and combine with electrons from the external circuit, to form the sodium electrode. The chloride ions react with the cathodic material to form metal chloride, and donate electrons back to the external circuit. During discharge, sodium ions conduct back through the separator, reversing the reaction, and generating electrons. The cell reaction is as follows:

$$n\text{NaCl} + M \leftrightarrow \text{MCl}_n + n\text{Na}^+ + ne^-$$

The solid separator is a ceramic solid electrolyte that conducts sodium ions during use. Suitable materials for the separators may include beta-alumina, beta'-alumina, beta"-alumina, beta'-gallate, or beta"-gallate. In certain embodiments, the separator includes a beta"-alumina. In one embodiment, the solid separator further includes alpha alumina.

As used herein, the term "ceramic component" refers to a part of the solid separator that is formed of alpha alumina. The alpha alumina may be relatively more amenable to bonding (e.g., compression bonding) than beta alumina, and may help with sealing the cell.

As used herein, the term "metal component" refers to a component of the electrochemical cell that needs to be bonded to the ceramic component for sealing the cell. The metal component, in certain embodiments, is a seal ring. The effectiveness of a seal ring relates to its ability to hermetically join to a mating surface. The metal component described herein comprises nickel, in some embodiments.

According to one embodiment of the invention, a method of sealing a ceramic component to a metal component in a metal halide battery is illustrated in a flow diagram of FIG. 1. The method is less complex than prior art methods, and involves fewer processing steps, while producing high-strength hermetic sealing. The method involves the steps of coating a portion of the ceramic component with a metallic coating, and then bonding the coated ceramic component to the metal component.

A variety of deposition techniques can be used for coating the ceramic component with a metallic coating. In one embodiment, the metallic coating is applied by a physical vapor deposition technique. Non-limiting examples of deposition techniques include ion-plasma deposition, sputtering, electron-beam physical vapor deposition and pulsed laser deposition. In a particular embodiment that is preferable for some situations, the metallic coating is deposited by an ion-plasma deposition technique.

Before deposition, the ceramic component may be polished or similarly treated, so as to remove manufacturing damage and/or improve surface flatness. For example, the surfaces may be polished to about 15 microns ANSI/CAMI. The ceramic components may further be chemically cleaned prior to coating, so as to remove contaminants that may affect bonding. Furthermore, the ceramic components may be thermally annealed and/or calcined at an elevated temperature prior to coating, so as to reduce contamination, reduce residual stresses, and/or heal defects that may have been introduced into the ceramic components during preparation. However, these steps of polishing, cleaning, annealing and calcining may not be essential for producing high-quality joints; and may be used individually or in combination as per requirement.

Figure 2:
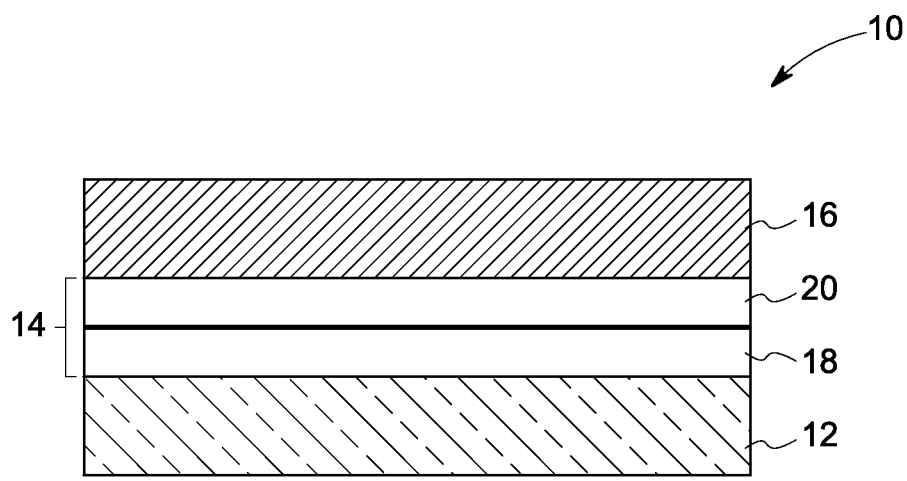
FIG. 2 is schematic of a sealing structure, according to another embodiment of the invention.

FIG. 2 illustrates a portion of a sealing structure 10 of a metal halide battery, in one embodiment. A portion of a ceramic component 12 is first coated with a metallic coating 14. The metallic coating 14 includes a reactive metal. The coated portion of the ceramic component 12 is then bonded to a metal component 16, to form the sealing structure 10.

The sealing structure 10 maintains a seal between selected contents of the cell and the environment. The sealing structure is often operable at a temperature greater than about 100 degrees Celsius. In some embodiments, the operation temperature of the cell ranges from about 300 degrees Celsius to about 500 degrees Celsius.

The reactive metal appears to migrate to the interface between the metallic coating and the ceramic component, and thereby enhances the bonding across the interface. Examples of suitable reactive metals may include chromium, yttrium, titanium, and elements of lanthanide series. In certain embodiments, chromium is the preferred reactive metal.

In some embodiments, the metallic coating 14 includes a reactive metal layer 18, followed by a transition layer 20. Usually, the reactive metal layer 18 is deposited on the ceramic component 12, followed by the deposition of the transition layer 20 over the reactive metal layer 18. The reactive metal layer 18 may include the reactive metal in elemental form or in solid solution. In a particular embodiment, the reactive metal layer 18 is a chromium layer. The transition layer 20 may include an alloy containing metals that are present in the reactive metal layer 18 and the metal component 16, so as to achieve good metal bonding between the two. In one embodiment, the transition layer 20 includes an alloy containing nickel. In some embodiments, the amount of nickel in the alloy may range from about 10 atomic percent to about 99 atomic percent, and in some certain embodiments, from about 70 atomic percent to about 90 atomic percent. In a particular embodiment, the transition layer 20 is a nickel-chromium (Ni—Cr) layer containing between about 10 atomic percent and 22 atomic percent of chromium. In another embodiment, the transition layer 20 comprises a nickel-titanium (Ni—Ti) material, e.g., a layer containing between about 1 atomic percent and about 10 atomic percent of titanium.

As discussed, the metallic coating 14 should strongly adhere to the ceramic component 12, so as to achieve a reliable bond with the metal component 16. Reliable adhesion of a layer or a thin film with a base material greatly depends on the deposition process employed, as well as the cleanliness and roughness of a surface upon which the film is deposited. The thickness of the layer may also be a significant factor. In some embodiments, the thickness of the reactive metal layer may range from about 100 nm to about 10000 nm, and in some certain embodiments, from about 100 nm to about 1000 nm. Furthermore, the transition layer may have thickness in a range from about 5 microns to about 50 microns.

In one embodiment, the metallic coating 14 is preferably deposited by an ion plasma deposition technique. Ion plasma deposition promotes highly adherent and uniform coatings.

Ion plasma deposition (IPD) is known in the art as a robust and relatively inexpensive technique for deposition of high quality electronically conductive coatings. It is a high-rate physical vapor deposition (PVD) process in which an electric vacuum arc rapidly heats the cathode surface, ejecting a mixture of highly ionized elemental species and neutral macroparticles. After an initial triggering of the arc at the surface of the cathode, the arc is sustained by the supply of electrical current through the cathode, using a current-controlled power supply. Coatings derived from multi-component alloy cathodes may be deposited onto the substrate to provide the reactive metal layer and/or the transition layer, for example a Ni—Cr layer.

In one embodiment, the transition layer is deposited immediately over the reactive metal layer, without breaking vacuum. This reduces undesirable reaction and contamination of the reactive elements (e.g., by water, hydrocarbons, oxygen), thereby enhancing the quality of the metal-ceramic and subsequent metal-metal joints.

After depositing the metallic coating onto the ceramic component, the coated component can be bonded to the metal component. Various bonding methods may be used for the purpose. Suitable, non-limiting examples are brazing and diffusion bonding. One embodiment provides diffusion bonding, a solid-state bonding process capable of joining metal and ceramic components. The process is dependent on a number of parameters, such as process time, applied pressure, bonding temperature, and surface roughness. Diffusion bonding typically involves holding the two components under stress at an elevated temperature—usually in a non-oxidizing atmosphere (e.g., hydrogen, nitrogen, argon) or vacuum. The compressive pressure or stress applied should be below those, which would cause macroscopic deformation of the components. In some embodiments, a compressive stress between about 30 MPa and 50 MPa, and in some specific embodiments, between about 30 MPa and about 40 MPa is applied.

In some embodiments, diffusion bonding is carried out at a temperature range from about 900 degrees Celsius to about 1000 degrees Celsius for about 10 minutes to about 30 minutes, using a pressure of about 30 MPa.

EXAMPLES

The example that follows is merely illustrative, and should not be construed to be any sort of limitation on the scope of the claimed invention.

Example 1

8 samples of alpha alumina collars having a circular ridge with an outer diameter of 28 mm and a surface area of 150 mm$^2$ were polished to about 14.5 microns ANSI/CAMI, using 600 grit silicon carbide paper. These samples were then cleaned in an ultrasonic bath by immersing in methanol for about 15 minutes. The samples were then dried by blowing off with compressed argon. After drying, the samples were heat treated in an air furnace at about 1200 degrees Celsius, for about 2 hours.

After heat treatment, the samples were placed in an IPD chamber. A chromium target and a Ni-10Cr (containing 10 weight percent chromium) target were positioned as cathodes. The chamber was evacuated to about $5\times10^{-5}$ Ton. A chromium coating was first deposited for about 30 seconds, followed by the deposition of a nickel-chromium coating for about 30 minutes. The chromium coating had a thickness of about 100 nm, and the nickel-chromium coating had a thickness of about 10 μm. After deposition, the chamber was allowed to cool down under vacuum for about 30 minutes, before removing the coated samples.

Each coated sample was then bonded to a nickel seal ring that matched the size of the ridge on the alumina collar by diffusion bonding under a compressive stress of about 30 Mpa, at a temperature of about 950 degrees Celsius, for about 30 minutes, in an atmosphere of 3% Hydrogen and balance Nitrogen.

The 8 bonded structures were subjected to a peel test. The peel test measures the load required to push apart the nickel seal ring from the bonded surface. The alumina section of the bonded structure was held in place, and the nickel section was pushed by a push rod. Table 1 shows the results of the peel test for the 8 bonded structures. It also shows eight typical test results for similar specimens bonded with the conventional paste-based technique described above. It is evident from these results that the ion plasma bonding technique resulted in comparable or stronger bonds.

TABLE 1

Results of peel test

| Sample No. | Load to failure (kN) Conventional Bonding Technique | Load to failure (kN) Ion Plasma Bonding Technique |
| --- | --- | --- |
| 1 | 2.72 | 2.51 |
| 2 | 2.19 | 2.78 |
| 3 | 2.45 | 3.24 |
| 4 | 2.24 | 2.95 |
| 5 | 2.57 | 2.91 |
| 6 | 2.42 | 2.91 |
| 7 | 0.63 | 2.91 |
| 8 | 2.38 | 1.91 |

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of sealing an alumina component to a nickel-containing metal component in a metal halide battery, comprising:
   coating a portion of the alumina component with a metallic coating by an ion plasma deposition technique; and
   bonding the coated alumina component to the nickel-containing metal component,
   wherein the metallic coating comprises a reactive layer comprising chromium disposed on the alumina component, and a transition layer comprising nickel and at least about 10 atomic percent chromium disposed on the reactive layer.

2. The method of claim 1, wherein the alumina component comprises alpha alumina.

3. The method of claim 1, wherein the reactive layer has a thickness in a range of about 100 nm to about 10000 nm.

4. The method of claim 1, wherein the amount of chromium in the transition layer ranges from about 10 atomic percent to about 22 atomic percent.

5. The method of claim 1, wherein the transition layer has a thickness in a range of about 5 microns to about 50 microns.

6. The method of claim 1, wherein the bonding step comprises diffusion bonding.

7. The method of claim 1, wherein bonding is carried out under a compressive stress ranging from about 30 MPa to about 50 MPa.

8. The method of claim 1, wherein bonding is carried out in a controlled atmosphere or under vacuum.

9. The method of claim 1, wherein bonding is carried out at a temperature in the range of about 800 degrees Celsius to about 1200 degrees Celsius.

10. A sealing structure of a metal halide battery, comprising:
- a ceramic separator within the metal halide battery;
- a metallic coating disposed on a portion of the ceramic separator; and
- a metal component bonded to the portion of the ceramic separator through the metallic coating,
- wherein the metallic coating comprises a reactive layer comprising chromium disposed on the ceramic separator, and a transition layer comprising nickel and at least about 10 atomic percent chromium disposed on the reactive layer.

11. The sealing structure of claim 10, wherein the ceramic separator comprises alpha alumina.

12. The sealing structure of claim 10, wherein the metal component comprises nickel.

13. The sealing structure of claim 10, wherein the amount of chromium in the transition layer ranges from about 10 atomic percent to about 22 atomic percent.

14. The sealing structure of claim 10, wherein the metallic coating disposed on the ceramic separator portion has been ion plasma-deposited.

* * * * *